UNITED STATES PATENT OFFICE.

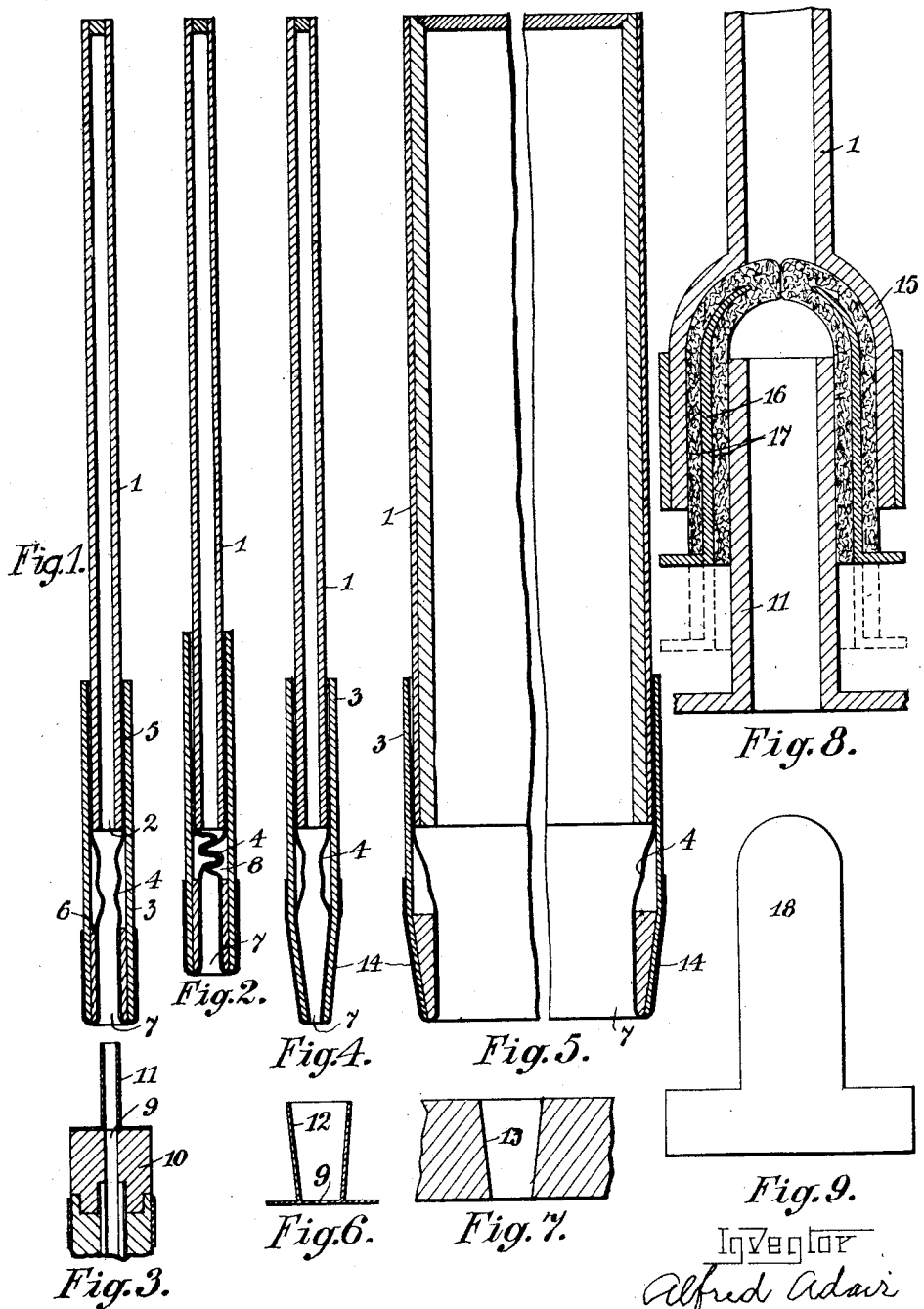

ALFRED ADAIR, OF TROYEVILLE, JOHANNESBURG, TRANSVAAL, SOUTH AFRICA.

PHOTOGRAPHIC APPARATUS.

1,172,922.     Specification of Letters Patent.     Patented Feb. 22, 1916.

Application filed May 5, 1914. Serial No. 836,566.

*To all whom it may concern:*

Be it known that I, ALFRED ADAIR, subject of the King of Great Britain, residing at Troyeville, Johannesburg, Transvaal, South Africa, have invented certain new and useful Improvements in and Relating to Photographic Apparatus, of which the following is a specification.

This invention has reference to a method of and means for loading and unloading photographic cameras, dark-slides, developing or fixing vessels and the like with plates or films, whereby a plate or film can without the aid of a dark room, be inserted in a dark-slide or camera, and after being exposed, be transferred to the developing-fixing and washing vessels, each consecutive transference being carried out in daylight.

The invention is of the kind in which light tight envelops are used, for holding and shielding the plates or films from day light. Hitherto plates contained within light-tight envelops, were placed within the dark slide or plate carrier of the camera, and a part or parts of the envelops had to be withdrawn before making the exposure in the usual way. After exposure had been made, the exposed plates were changed in a changing bag, or in some cases the dark slide containing the plates was bodily introduced into a developing vessel, and the developer was brought into contact with the plates by withdrawal of the shutter of the dark slide. There are certain disadvantages in these systems.

Now the present invention differs from the above mentioned arrangements, in that no changing bag is required between exposure and development, the envelops are not placed within the dark slide of the camera, or in the developing or other vessel. Such envelops according to the present invention are used for transferring the plates from the magazine into the dark slide or camera, or from the dark slide to the developing vessel, or from the developing vessel to the fixing vessel and so on, and sheltering them from light during their journey from one part of the photographic equipment to another part.

In carrying the invention into effect, the envelops or sheaths can be made of any suitable material, and are provided with an aperture at one end through which the plate or film can be inserted into the envelop or be removed therefrom, and this aperture is closable so as to prevent the light from entering through it.

There is also provided in connection with the camera or dark slide, also in connection with the developing vessel, fixing vessel, etc., a narrow slit or aperture just large enough to allow for the passage of a photographic plate or film. This slit has projecting lips or flanges so as to receive the mouth or apertured end of the envelop, the said apertured end of the envelop and the projecting lips of the slit, being adapted to spigot or fit the one into the other in a light tight manner. When therefore a loaded envelop has its apertured end fitted onto or into the lips of the slit in say the dark slide, the plate or film can be transferred from the envelop into the dark slide, and after exposure transferred back into the envelop, being sheltered from light in its journeys between the dark slide and envelop. When the envelop is removed from the slit, its apertured end closes up, and the envelop loaded with the exposed plate, has its apertured end inserted onto or into the lips projecting from the slit in the developing vessel. The exposed plate can then be transferred from the envelop into the developing vessel, and after development, the developing agent may be run out of the developing vessel, and subsequently the operations of washing the plate and fixing it, are accomplished by running in the requisite amount of water and fixing solution in succession. Thus the various operations of transferring for exposure, developing, washing and fixing are gone through without the use of a dark room or changing bag.

The invention will be understood from the following description, reference being had to the accompanying drawings which set forth how the various operations of loading and unloading cameras, dark slides, developing tanks and the like with plates or films in daylight without the aid of a darkroom, are performed, in which, Figures 1 and 2 are vertical cross sections through one of my envelops with the light tight closure of the aperture at the lower end through which the plates can be withdrawn or inserted; Fig. 3, a vertical section of the slit or aperture of the dark slide onto which the apertured end of the envelop fits; Figs. 4 and 5, vertical sections of my envelop with tapered end to fit the tapered slits or apertures; and Figs. 6 and 7, vertical sections of those tapered slits or apertures; Fig. 8 is a vertical section of part of another of my envelops with light tight closure at the lower end; and Fig. 9, a plug therefor.

Referring first to Figs. 1 and 2, 1 is the envelop which is made of any suitable material such as metal, wood, celluloid, paper or cardboard rendered impervious to actinic light, and preferably stiff. This envelop whose dimensions inside are only very slightly larger than the photographic plate, has an aperture 2 at one end, capable of being closed light tight, by means of a part 3 which encircles the lower part of the body of the envelop and is capable of sliding thereon. From the lower end of the envelop, extends the flexible sleeve 4 of velvet or other suitable fabric, the mouth of which is permanently joined to the lower end of the sliding part 3, in such manner that the envelop 1 and sliding part 3 are coupled together by this flexible sleeve 4, while allowing the sliding part 3 to have a limited sliding movement. When the sliding part 3 is slid outward, the flexible fabric 4 is straightened out as shown in Fig. 1, thus allowing a photographic plate to be inserted into or removed from the envelop 1, but if slid back the flexible sleeve 4 crumples or folds up and makes a light tight closure as shown in Fig. 2. In order to diminish friction of the parts moving in contact, the lower end of the envelop may have an external band 5 around it, so that the part 3 only comes in contact with comparatively narrow contacting faces. The outer end of the sliding part 3 is thickened inside at 6, so that the opening or mouth is approximately of the same dimensions as the aperture 2, and yet a chamber or space 8 is left in which the flexible sleeve 4 can crumple or fold up.

In Figs. 3–9, the narrow slit or aperture in connection with a dark slide or camera 10 is just large enough to allow for the passage of a photographic plate or film, and 11 the lips or flanges which project outward therefrom. The mouth 7 of the envelop fits on to these projecting lips 11. When therefore a loaded envelop has its apertured end 7 fitted onto the lips 11, and the sliding part 3 of the envelop is extended to straighten out the sleeve 4, the plate can be transferred from the envelop into the dark slide or direct into the camera back, being sheltered from light in its journey. The envelop is left in position on the lips so as to prevent light from entering through the apertures 9. The dark slide is then placed in the camera and the exposure made, after which the dark slide is removed, the plate returned to the envelop, the sliding part 3 pushed back so as to crumple or fold up the flexible sleeve 4. The exposed plate is thus contained within the envelop, the tight closure preventing light from obtaining access to the plate. A like operation is then gone through in connection with the developing tank, the apertured end of the envelop being inserted onto lips similarly to 9.

In Figs. 4–7 the apertured end of the envelop is arranged to be inserted into the lips 12 of a slot 5, the lips 12 in this case being splayed or bell-mouthed (Fig. 6), or the apertured end of the envelop may be inserted direct into a slot provided with tapered sides 13 (Fig. 7). The sliding part 3 of the envelop (Figs. 4 and 5) has a tapered end 14, so as to fit light tight into the tapered slot 13, or into the tapered aperture formed by the lips 12.

There are numerous other ways in which a light tight closure of the apertured end of the envelope can be effected. Thus in Figs. 8 and 9, the lower end of the envelop 1 is enlarged so as to form a chamber 15 domed at the top. This chamber contains within it a sleeve 16 made springy or compressible at its upper end, and has velvet 17 or other suitable fabric cemented to it inside and out. This velvet covered flexible sleeve 16 inside the chambered end of the envelop fits onto the lips 11 which project from the apertured slot in the dark slide, etc., and is capable of being slid longitudinally up and down in the chambered end of the envelop. When slid upward, the upper ends of the sleeve 16 are deflected and closed together by the domed top, and make a light-tight closure of the apertured end of the envelop, but when the sleeve 16 is slid downward into the position shown by the dotted lines, the upper ends assisted by their springy nature are drawn apart so as to allow for the passage of a photographic plate. The envelop is shown inserted onto the lips 11 of the aperture, but when removed from the lips, a plug 18 is inserted into the velvet covered sleeve 16 to insure the said sleeve being held in the chambered end.

I declare that what I claim is:—

1. In a system of daylight photography an envelop of rigid construction closed at one end, a rigid collar at the other end capable of sliding relatively to said envelop and a light-tight material between said collar and said envelop to close the opening of the envelop in a light-tight manner or to allow of the passage of a plate into or out of said envelop.

2. In a system of daylight photography, an envelop of rigid construction closed at one end and provided at the other end with a rigid collar capable of sliding relatively to said envelop and non-actinic material connected to said collar and to said envelop so that in one position of collar the material crumples up so as to close the opening of the envelop in a light tight manner, while in a second position of the collar the envelop is opened to admit of the passage of a plate.

3. In a system of daylight photography, an envelop of rigid construction closed at one end and provided at the other end with a rigid collar capable of sliding relatively to said envelop and non-actinic material forming a collar and connected around the outer side of said envelop and the inner side of said collar so that in one position of the collar it is crumpled up so as to close the opening of the envelop in a light tight manner, while in a second position it admits of the passage of a plate into or out of said envelop.

4. In a system of daylight photography, an envelop of stiff and durable material closed at one end and provided at the other end with a rigid collar capable of sliding relatively to said envelop and a collar of non-actinic material connected at one end around the outer side of said envelop and at the other end around the inner side of said collar so as to close the envelop in a light tight manner for one position of the collar and to open it so as to admit of the passage of a plate into or out of said envelop when the collar is in a second position.

5. In a system of day-light photography an envelop of rigid construction closed at one end, a rigid collar having a chamfered or tapered end provided at the other end of said envelop and capable of sliding relatively thereto with the tapered end outward, and a non-actinic material adapted to close the opening of the envelop in a light-tight manner or to admit of the passage of a plate into or out of said envelop.

In witness whereof, I have hereunto signed my name this 28th day of March, 1914, in the presence of two subscribing witnesses.

ALFRED ADAIR.

Witnesses:
L. F. HELLIER,
C. B. HENDERSON.

Copies of this patent may be obtained for five cents each, by addressing the "Commissioner of Patents, Washington, D. C."